(12) United States Patent
O'Malley

(10) Patent No.: US 6,644,695 B2
(45) Date of Patent: *Nov. 11, 2003

(54) METHOD FOR MERCHANDISING MOUSE PADS

(76) Inventor: Daniel L. O'Malley, 2841 Illinois Rd., Wilmette, IL (US) 60091

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/459,614

(22) Filed: Dec. 13, 1999

(65) Prior Publication Data

US 2001/0041232 A1 Nov. 15, 2001

(51) Int. Cl.$^7$ .......................... B42D 15/00; B42D 5/00; B42D 3/00
(52) U.S. Cl. .................... 283/63.1; 281/15.1; 281/21.1; 281/35; 281/36; 281/37; 281/38; 283/63.1; 428/195; 248/188.2; 248/346.1; D14/114; 40/768; 40/773
(58) Field of Search ............................. 281/15.1, 21.1, 281/35, 36, 37, 38; 428/195; 248/188.2, 346.1; D14/114; 40/768, 773; 283/63.1

(56) References Cited

U.S. PATENT DOCUMENTS

| | | | |
|---|---|---|---|
| 4,492,306 A | 1/1985 | Cooper et al. | 206/216 |
| 4,596,407 A | 6/1986 | Suska | 281/15 R |
| 4,603,494 A | 8/1986 | Lehrman | 38/140 |
| 4,789,187 A | 12/1988 | Corlew et al. | 281/15 R |
| 4,834,502 A | 5/1989 | Bristol et al. | 350/322 |
| 5,098,127 A * | 3/1992 | Williamson et al. | 281/15.1 |
| D339,799 S | 9/1993 | Allen | D14/114 |
| 5,340,075 A | 8/1994 | Schriner | 248/346 |
| D359,036 S | 6/1995 | Mandel | D14/114 |
| 5,433,979 A | 7/1995 | Williams | 427/496 |
| D364,397 S | 11/1995 | Bedol | D14/114 |
| D365,342 S | 12/1995 | Evenson et al. | D14/114 |
| 5,508,084 A | 4/1996 | Reeves et al. | 428/172 |
| 5,696,536 A | 12/1997 | Murphy | 345/163 |
| 5,919,562 A | 7/1999 | Root | 428/343 |
| 5,942,311 A | 8/1999 | Scianna | 428/195 |
| 5,997,995 A * | 12/1999 | Scianna | 428/195 |
| 6,475,585 B1 * | 11/2002 | Yamanashi et al. | 428/40.1 |
| 2002/0020796 A1 * | 2/2002 | Pearson | 248/346.01 |
| 2003/0066940 A1 * | 4/2003 | Pearson | 248/346.01 |

* cited by examiner

Primary Examiner—A. L. Wellington
Assistant Examiner—Mark T. Henderson
(74) Attorney, Agent, or Firm—James A. Geppert

(57) ABSTRACT

A novel method of advertising in appropriate bound or unbound publications wherein the pages of the publication are folded in half and may be bound along one edge by either saddle-stitching or perfect-binding the pages at the center of the publication together, wherein a carrier member formed of a folded member that is appropriately bound into the publication and has at least one adhesive strip or a plurality of adhesive spots positioned adjacent one edge for mounting a substantially thinner mouse pad thereon for ease of removal and subsequent use. The mouse pad is formed of a thin generally transparent plastic material and carries advertising printed on the undersurface of the pad, which advertising is viewed through the transparent pad; the mouse pad acting to insure that the publication will flip open at the position of the pad so that the viewer or reader will see the advertising early in the inspection of the publication. The mouse pad may be glued onto the surface of a page in an unbound publication, onto the glue stub of a bindery hanger or onto a carrier card of either a single carrier card page or a folded over double page for the carrier card.

10 Claims, 4 Drawing Sheets

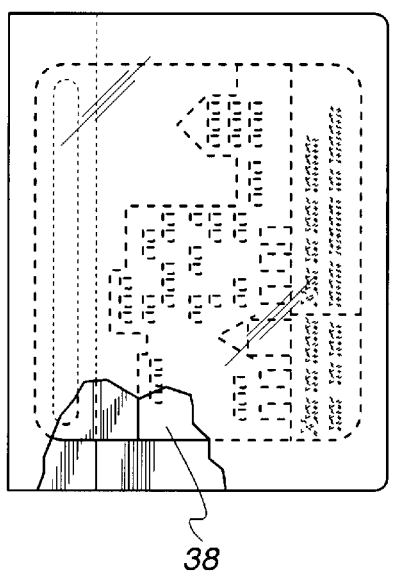
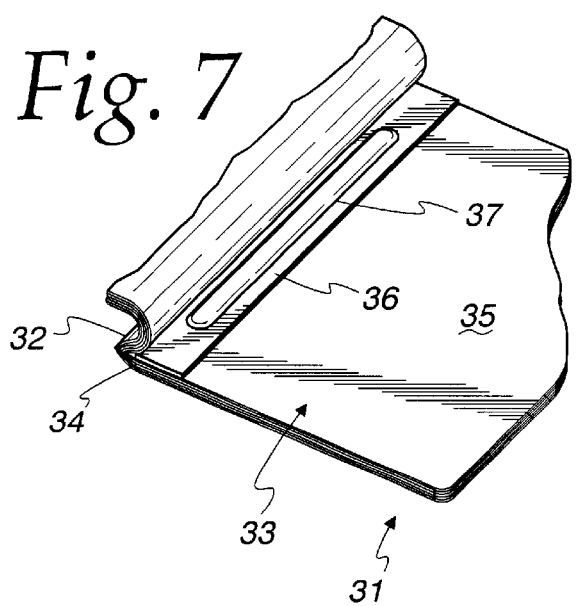
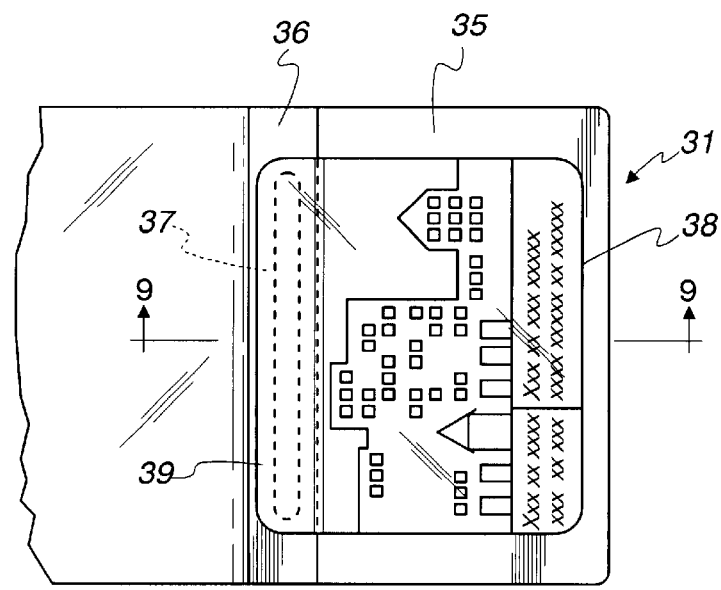
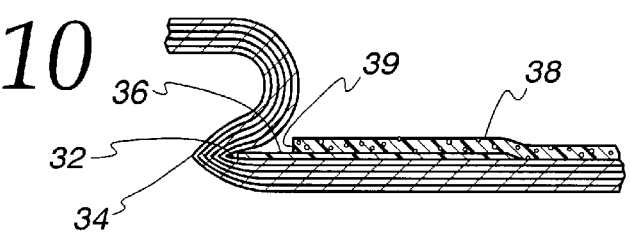

METHOD FOR MERCHANDISING MOUSE PADS

TECHNICAL FIELD

The invention disclosed herein relates to a novel method of merchandising a mouse pad in publications for the purpose of advertising of products wherein the mouse pad causes the publications to automatically open at the pad and enhance the advertising to the reader.

BACKGROUND

Advertising in publications, such as magazines, has been varied in conception and practice. Magazine advertising consists of advertising pieces that are either included in the bound pages or inserted in a fairly scattered manner. Advertising inserts can be bound into a magazine whether the magazine has a saddle-stitched or stapled binding or a perfect-bound or glued binding; the advertising piece being either a single sheet carrier card that is glued onto a page in the publication or a folded carrier card integrated into the folded pages so that a portion of the advertising piece extends into one or more locations depending on the position of the folded page. Likewise, if a bindery hanger is utilized as the carrier for the advertising piece, the hanger may also be bound into the publication by either the saddle-stitched or perfect-binding method. The bindery hanger may either have a counterbalance provided with a glue stub for a separate advertising piece or have a counterbalance and a carrier card folded for insertion in the publication. Clearly, if an advertising piece is of a slightly thicker nature due to the weight or thickness of the paper or other material, the publication will have the tendency to fall open at the thicker page thus calling the reader's attention to the advertising.

With the advent of the computer mouse which contacts and moves on a mouse pad as a friction surface, the mouse runs on a roller which engages the upper surface of the pad, and the pad has a non-slip lower surface which engages the desk top or other surface supporting the mouse, mouse pad and computer keyboard. The computer mouse typically is a hand-held device operating on the mouse pad which, in cooperation with the computer hardware and software, permits a computer operator to control the path and movement of a cursor or pointer located on the computer display monitor; the mouse having activation buttons so that the appropriate computer programs can be accessed and activated for operations of the computer. The use of a mouse greatly increases the speed and ease of inputting commands to the computer and facilitates much faster data entry than that provided by keyboard usage.

The conventional mouse pad construction presently utilized consists of a flat smooth pad surface which is contacted by the computer mouse and a backing of non-slip material which is formed of a foam rubber or other appropriate material having a substantial thickness. In the recently issued U.S. Pat. No. 5,942,311 of Carl Scianna and entitled "Improved Non-Slip Mat or Pad", a substantially thinner mouse pad is disclosed formed of a thin plastic sheet with a tacky backing that adds substantially no appreciable thickness to the pad. The improved thinner mouse pad can have advertising material printed on it by adding the advertising images onto the lower surface of a pad formed of a transparent plastic material with the images being visible through the pad thickness. The novel thinner mouse pad opens up new vistas for the usage of the pad in a variety of new ways.

SUMMARY OF THE INVENTION

The present invention relates to a novel and improved method of adding advertising to magazines and other edge bound periodicals or publications by the insertion into the publication a substantially thinner mouse pad formed of a mostly transparent plastic material with advertising showing through the pad by utilization of presently known methods of binding the magazine; i.e., saddle-stitching or perfect binding. The mouse pad may thus be placed into mass distribution for the publication, such as over-the-counter sales or by subscription, either paid or free, distributed through the mail or other means and, due to the added thickness of the mouse pad over that of an ordinary page, will allow the reader to easily flip open the publication to the mouse pad advertising. Further, once the reader sees the mouse pad and wishes to use it, the pad is easily removable from the magazine and positioned by the computer keyboard and under the mouse.

The present invention also comprehends the application of a thin mouse pad to the publication during the binding process by being releasably joined or glued to a carrier card or bindery hanger within the publication with a plurality of releasable glue spots, narrow strips of releasable glue or a network of the releasable glue applied over the carrier card or the glue stub of a bindery hanger to retain the pad in the publication until removed by the reader. A special carrier card in the publication carries the mouse pad wherein the magazine is bound by a saddle-stitch or perfect-bound binding. In the same manner, an edge of the pad may be glued to the glue stub of a counterbalance for a bindery hanger that is bound into either type of bound publication.

Also contemplated by the present invention is the provision of a substantially thinner mouse pad inserted into and releasably mounted in an unbound publication such as a newspaper, either tabloid or full size wherein the mouse pad has one or more narrow strips of releasable glue applied thereto and the pad is attached onto the surface of a sheet of the publication. Other objects and advantages of the present method will be obvious upon consideration of the specification and claims of the present application.

BRIEF DESCRIPTION OF THE DRAWINGS

FIG. 6 is a top plan view of a saddle-stitched publication with a portion broken away showing the pad insert mounted on the glue stub of a bindery hanger.

FIG. 7 is a perspective view of the publication of FIG. 6 with pages folded to show the bindery hanger bound into the publication and having a glue strip on the stub providing a mounting portion for the pad.

FIG. 8 is a top plan view similar to FIG. 7 with the magazine pages folded back to show the pad inserted into the publication and retained therein.

FIG. 9 is a partial cross sectional view of the publication taken on the line 9—9 of FIG. 8.

FIG. 10 is an enlarged view of the bindery hanger and edge of the pad of FIG. 9.

ILLUSTRATIVE EMBODIMENTS OF THE INVENTION

Figure 1:
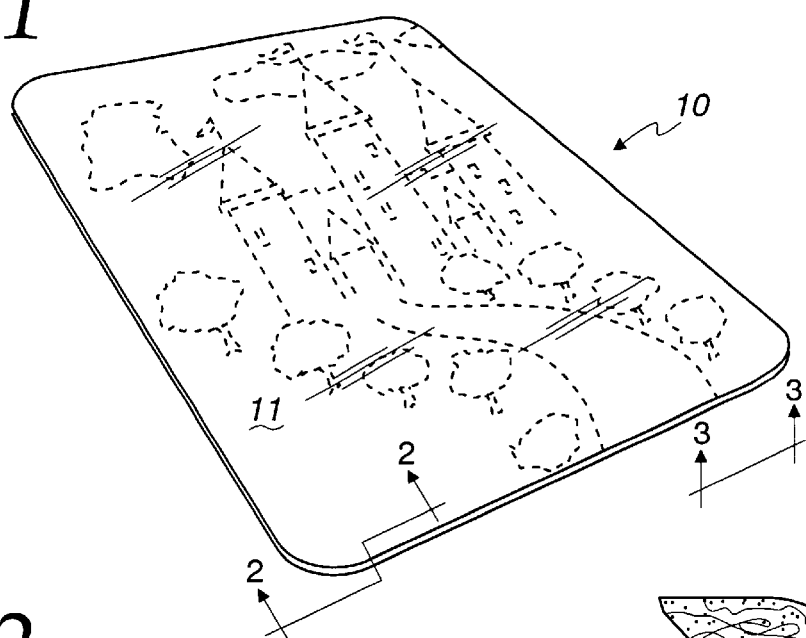
FIG. 1 is a perspective view of a mouse pad of the present invention.
Figure 2:
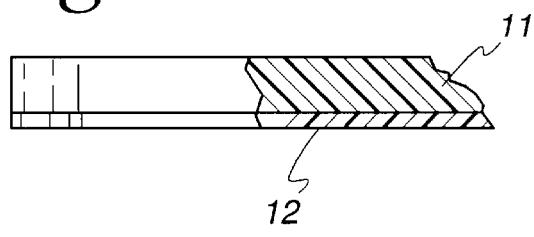
FIG. 2 is a partial cross sectional view of the mouse pad taken on the irregular line 2—2 of FIG. 1.
Figure 3:
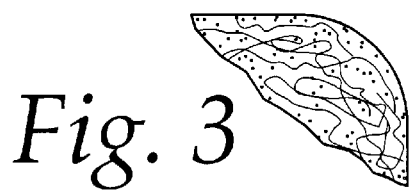
FIG. 3 is a partial lower elevational view of a corner of the lower surface of the pad taken on the line 3—3 of FIG. 1.
Figure 4:
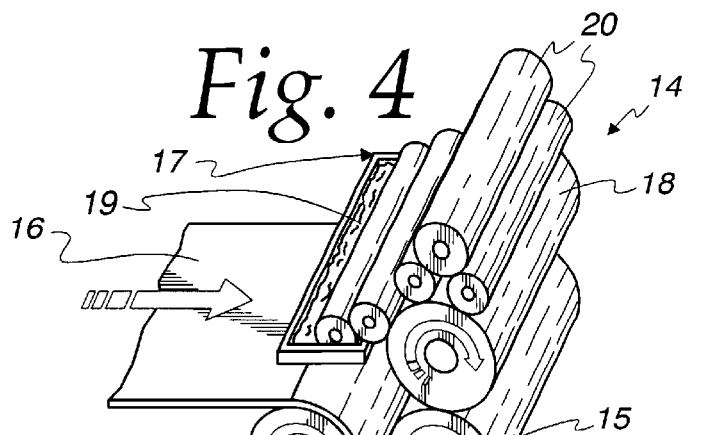
FIG. 4 is a partial perspective view of a portion of a web feeding press for the manufacture of the pad.

Referring more particularly to the disclosure in the drawings wherein are shown illustrative embodiments of the present invention, FIG. 1 discloses a mouse pad 10 which is substantially thinner than presently known pads and provides a surface for operation of a computer mouse or other mat or pad application; the overall thickness of the mouse pad being in the range of 1.0 mil to 30.0 mils, with a preferred thickness in the range of 10.0 to 30.0 mils. The mouse is formed of a thin, generally transparent plastic sheet or carrier 11 made of substantially rigid thermoplastic material, such as polyvinyl, polypropylene, polycarbonate, polystyrene or polyester material. To this thin plastic sheet is added a coating 12 of a suitable ink containing an agent providing a tacky texture for the non-slip characteristics of the pad. The plastic sheet is generally transparent and the ink or inks are applied to the lower surface of the pad to provide images that can be viewed through the plastic sheet. The ink or inks which can be used to provide a coating or film are ultraviolet (U.V.) inks which are cured by exposure to ultraviolet light, water-based inks or solvent-based inks, both of which are cured by drying. A dielectric material is generally added to the ink to prevent static, especially where the pad is used as a mouse pad, and the ink formulation may contain a scent to offset the odor of the ink.

As the pad must not slip on the desktop or other surface which the pad contacts, the ink formulation is provided with a tackifier or tackiness agent to provide the pad with a non-slip characteristic, but which is not sticky to the touch. One such material is an acrylated polymer having a viscous composition and a characteristic acrylic odor, the polymer being practically insoluble in water.

Application of the non-slip surface and ink images to the underside of the pad is accomplished by one of several methods. The preferred method is to apply the ink as a liquid coating 12 to the underside of the thin plastic sheet or substrate 11 by passing through a series of opposed pairs of rollers 15 in a web feed apparatus 14. A coating attachment 17 for the press 14 applies the ink coating 12 via the rollers 18 to an elongated strip of a substrate plastic material 16; the coating attachment including a tray 19 for the ink or inks with a series of rollers 20 leading to the rollers 18 which are in contact with the rollers 15 to apply the coating to the strip of the substrate. The acrylic polymer acting as a tackiness agent can be either mixed with the ink or applied in a separate step in the coating process by a second tray and sets of rollers.

Figure 5:
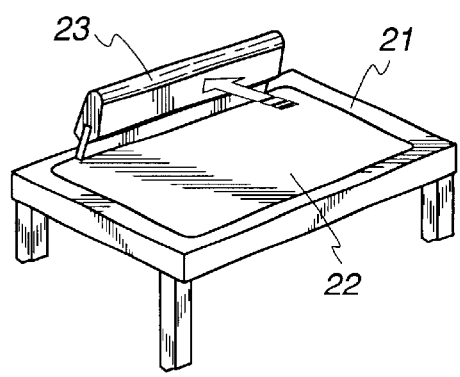
FIG. 5 is an illustrative view of a silk screening operation for the coating of the non-slip surface of the pad with desired advertising applied thereto.
Figure 11:
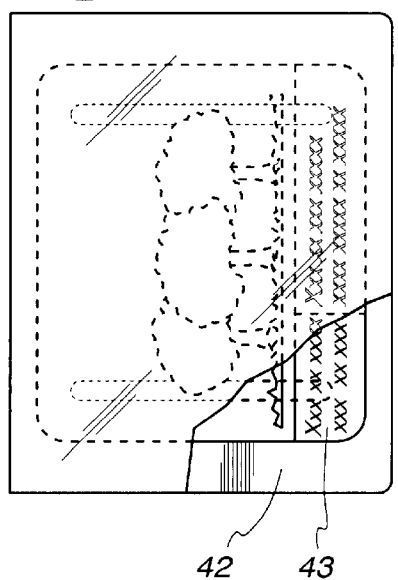
FIG. 11 is a top plan view of a perfect-bound publication binding partially broken away and showing a pad mounted on a single-page carrier card.
Figure 12:
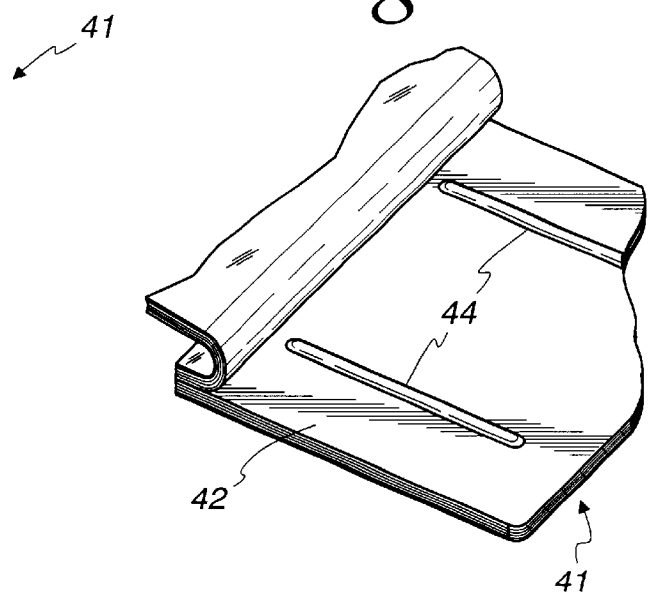
FIG. 12 is a perspective of the publication with pages folded away to reveal the mouse pad mounted therein.
Figure 13:
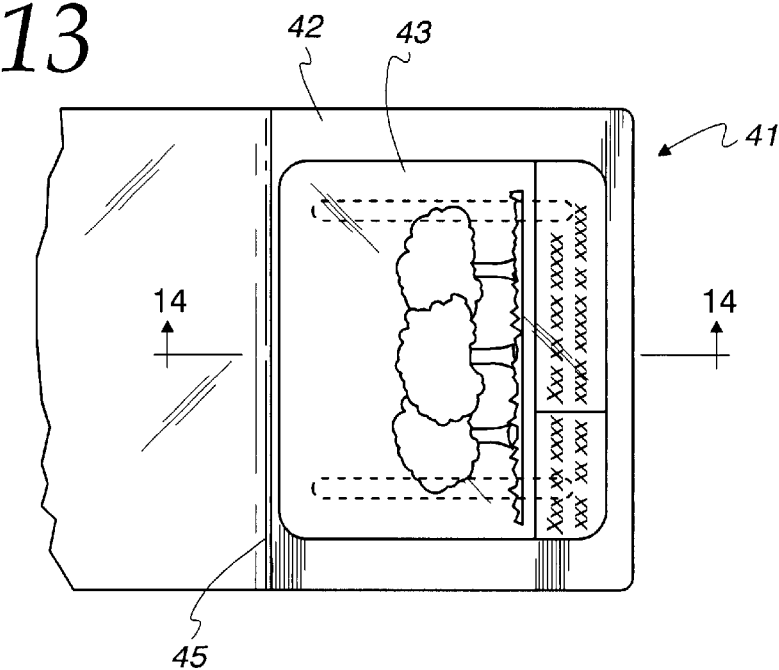
FIG. 13 is a top plan view similar to FIG. 12 with the pages folded back to show the pad.
Figure 14:
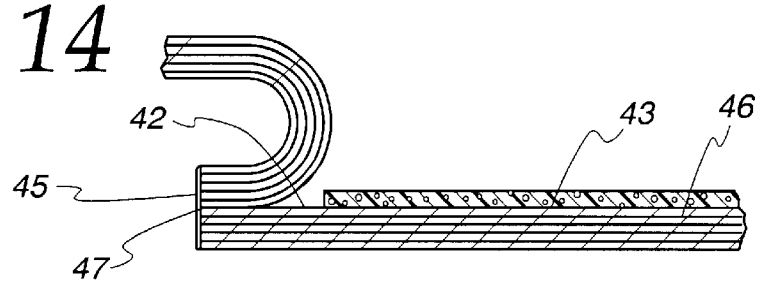
FIG. 14 is an enlarged cross sectional view taken on the line 14—14 of FIG. 13 and showing the placement of the mouse pad on the carrier card.

Another method of forming the non-slip surface for the pad is to apply the liquid ink compounded with the acrylated polymer to provide the non-slip characteristics for the pad by a silk screening process shown in FIG. 5. The basic process disclosed in this figure provides a frame 21 for holding the screen 22 so as to cover the surface of the pad with the U.V. ink being applied onto the surface of the pad through the screen by a squeegee 23. Obviously, if a design is desired in the non-slip surface, the pad could be processed through a series of screens for multiple colors and the design will be observable through the transparent plastic material. Thus, a school emblem, team logo, corporate or business logo, picture, advertising message (promotional message) or other design is applied in steps to the underside of the strip in a reverse printing process with appropriate inks and the tackiness agent. Once the inks are applied and cured, the individual pads are cut or stamped out of the strip, leaving substantially no waste. The pad could be marketed in the same manner as presently done where it is packaged in a plastic sleeve or envelope which is displayed on racks or other similar structures.

A new and novel approach to the display of the mouse pads is in the use of the pads with appropriate advertising as an insert in a magazine or other publication as shown in FIGS. 6 through 14. Considering FIGS. 6 through 10, a magazine 31 provided with a saddle-stitched binding 32 has a bindery hanger 33 bound into the edge 34 of the magazine. The bindery hanger, as shown, consists of a counterbalance 35 and a folded over glue stub 36, which stub receives a narrow strip 37 of a releasable glue, and an edge 39 of a mouse pad 38 contacts and is releasably glued to the glue stub 36 of bindery hanger 33 as shown in FIGS. 7 and 8. As the mouse pad 38 is capable of receiving printing on the underside, the pad acts as an advertising piece for an advertiser in the magazine. Although shown as a counterbalance and integral glue stub for mounting the mouse pad, the bindery hanger may consist of two integral folded pages with one page being the counterbalance and the opposite page being a carrier card for the mouse pad. Further, although shown with the saddle-stitched binding for a publication, the bindery hanger could be equally adapted for use in a perfect bound publication. The mouse pad is substantially thinner than conventional pads and does not add substantial thickness to the overall thickness of the publication, however, the nature of the pad will promote the publication falling open to expose the advertising to the consumer or reader.

Now considering FIGS. 11 through 14, a perfect-bound publication 41 is provided with a single sheet carrier card 42 for releasably mounting a mouse pad 43 on the card 42, the carrier card being provided with a pair of parallel glue strips 44 extending across the carrier card to releasably mount the mouse pad on the card. In a like manner, a network of releasable glue strips or a plurality of substantially equally spaced releasable glue dots could be applied to the surface of the carrier card to which the mouse pad adheres. The single carrier card can be bound into the glue spine 45 of the publication or could be glued along an edge to a bound page of the publication adjacent the spine. Also, the carrier card may be a double sheet that is folded over along with the other folded pages 46 of the publication, which pages are assembled and glued along the folded edges to form the spine of the publication. Here again, the single or folded carrier card may also be bound in a publication by saddle-stitching along the edge 47 as shown for the bindery hanger shown in FIGS. 6 through 10.

Figure 15:
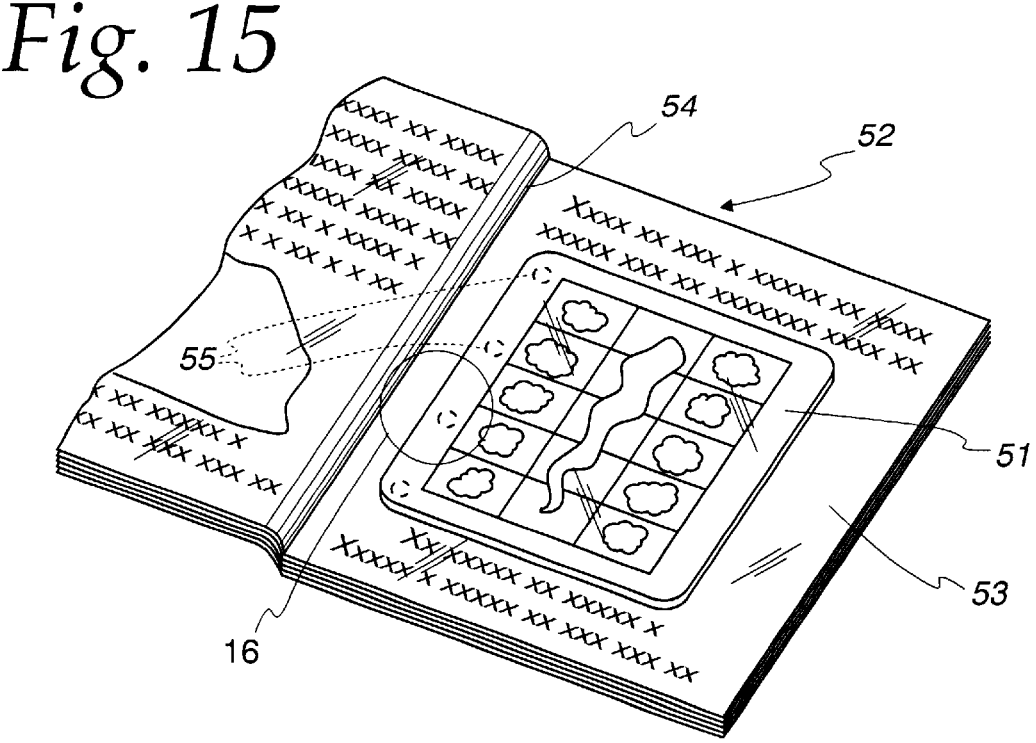
FIG. 15 is a partial perspective view of a publication having loose pages with the mouse pad adhering to a page surface.
Figure 16:
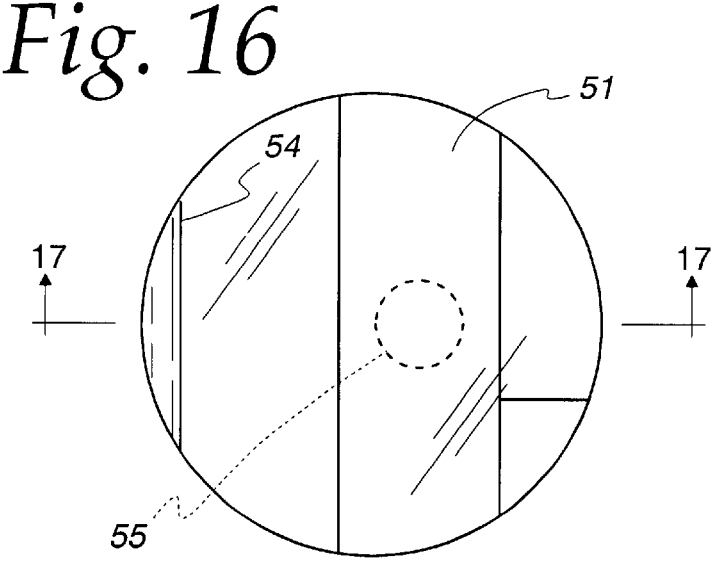
FIG. 16 is an enlarged partial view indicated by circle 16—16 of FIG. 15.
Figure 17:
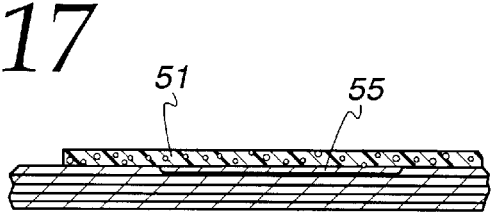
FIG. 17 is an enlarged partial horizontal cross sectional view taken on line 17—17 of FIG. 16.

Although this invention has been described for use with a bindery hanger or carrier card, either one formed of a single sheet folded over for insertion into the publication, the invention also comprehends the use of a multi-page insert of four, eight, sixteen or other even number of pages resulting from two, four or eight sheets, etc., folded over and inserted and bound into the publication. Thus, an advertiser could submit the printed insert ready for binding into the publication, and a thin mouse pad could be releasably glued onto any suitable surface of the insert As a further example shown in FIGS. 15 through 17, a mouse pad 51 could be inserted and releasably mounted in an unbound publication 52 merely by securing the pad onto an appropriate location on a page surface 53 of the unbound publication by the use of one or more narrow strips or one or more lines of spots of releasable glue 55. The reader of the unbound publication can observe the mouse pad 51 in the publication for its advertising matter and can easily remove the pad and use it in an appropriate manner. Likewise, a mouse pad could be releasably mounted on a page of a bound publication, such as a magazine without the use of a carrier card or strip.

Thus, the mouse pad with appropriate advertising can be a subject of mass distribution by mounting it in either of the two above-noted methods in magazines or similar bound or unbound publications, which publications are either distributed by subscription or as complementary publications or displayed on newsstands and through stores and other retail establishments.

What is claimed is:

1. A method of providing a mass distribution of advertising in publications with bound or loose pages having printed material thereon and utilizing a substantially thinner mouse pad formed of a generally transparent plastic material having an upper surface and an undersurface with advertising printed on one surface thereof, the method comprising mounting at least a portion of said undersurface along one edge of said pad onto the surface of a page of a publication, said pages of the publication being bound along one edge, and a carrier member appropriately bound within the binding, said member being a single page carrier card that is adhesively joined to a page of the publication adjacent the bound edge thereof, said mouse pad being releasably secured onto said carrier member and is easily removable from the page for its intended use.

2. A method as set forth in claim 1, in which said mouse pad carries advertising on the undersurface of the pad, which advertising is viewed through the transparent material of the pad.

3. A method as set forth in claim 1 in which said carrier member includes a bindery hanger of an appropriate material that is bound into the edge of the publication and carries at least one adhesive strip thereon onto which the mouse pad adheres.

4. A method as set forth in claim 1 in which said carrier member is folded over and, with its folded edge, is carried in the binding of the publication.

5. A method as set forth in claim 1 in which said publication comprises a plurality of unbound double or multiple pages providing folded edges generally aligned along one edge thereof.

6. A method as set forth in claim 1, wherein said pages arc folded and bound into the publication by saddle-stitching.

7. A method as set forth in claim 1, wherein said pages are folded and bound together by perfect-binding of the publication.

8. A method as set forth in claim 1, wherein said carrier member is a full page carrier card with two or more releasable glue strips upon which the mouse pad is suitably secured.

9. A method of providing a mass distribution of advertising in publications with bound or loose pages having printed material thereon and utilizing a substantially thinner mouse pad formed of a generally transparent plastic material having an upper surface and an undersurface with advertising printed on one surface thereof, the method comprising mounting at least a portion of said undersurface along one edge of said pad onto the surface of a page of a publication, said pages of the publication being bound along one edge, and a carrier member appropriately bound within the binding, said member being a bindery hanger adapted to be bound into the publication and including a counterbalance and a folded over glue stub, said glue stub carrying releasable glue for mounting the mouse pad thereon, said mouse pad being releasably secured onto said carrier member and easily removable from the page for its intended use.

10. A method as set forth in claim 4, in which said member is a folded full-page carrier card bound into the publication and carries a plurality of glue area spaced over the surface of the carrier card with the mouse pad positioned on and adhesively joined onto the carrier card.

\* \* \* \* \*